(12) United States Patent
Chieh

(10) Patent No.: US 6,460,898 B1
(45) Date of Patent: Oct. 8, 2002

(54) UNIVERSAL PIPE JOINT

(76) Inventor: Peter T. C. Chieh, 5501 Engineer Dr., Huntington Beach, CA (US) 92649

( * ) Notice: Subject to any disclaimer, the term of this patent is extended or adjusted under 35 U.S.C. 154(b) by 0 days.

(21) Appl. No.: 09/547,143

(22) Filed: Apr. 11, 2000

(51) Int. Cl.[7] .............................................. F16L 27/04
(52) U.S. Cl. ........................ 285/261; 285/51; 285/52; 285/92; 285/146.1; 285/264; 285/266; 285/268; 285/404
(58) Field of Search ................................. 285/261, 264, 285/51, 146.1, 92, 404, 266, 268, 52

(56) References Cited

U.S. PATENT DOCUMENTS

| ,664,291 A | * | 12/1900 | Reniff | 285/107 |
| 1,057,939 A | * | 4/1913 | Cooper | 285/261 |
| 1,162,527 A | * | 11/1915 | Tabbert | 285/261 |
| 1,179,594 A | * | 4/1916 | Wood | 285/261 |
| 1,475,090 A | * | 11/1923 | Taylor | 285/261 |
| 2,421,691 A | * | 6/1947 | Gibson et al. | 285/101 |
| 2,564,938 A | * | 8/1951 | Warren | 285/95 |
| 3,276,796 A | * | 10/1966 | Daniel | 285/261 |
| 3,426,588 A | * | 2/1969 | Nelson | 285/11 |
| 3,995,889 A | * | 12/1976 | Carr et al. | 285/91 |
| 4,082,320 A | * | 4/1978 | Weinhold | 285/31 |
| 4,139,221 A | * | 2/1979 | Shotbolt | 285/18 |
| 4,486,037 A | * | 12/1984 | Shotbolt | 285/261 |
| 5,290,075 A | * | 3/1994 | Allread | 285/261 |

* cited by examiner

*Primary Examiner*—J. J. Swann
*Assistant Examiner*—Carlos Lugo
(74) *Attorney, Agent, or Firm*—Albert O. Cota

(57) ABSTRACT

A universal pipe joint for attaching two round pipes together accommodating misalignment using a female adapter fitting (30) engaging a male adapter fitting (44), each having a radial interior and exterior diameter (38) and (50) with a compression nut (52) urging them together. The female fitting has external threads (40) with a number of locking grooves (42) at right angles to the threads, and a compression nut with a spring-loaded ball (54) therein that clicks into the grooves while the nut is being tightened. When the nut is fully tightened, the radial diameters are compressed and the ball (62) is locked into the groove with a set screw (66). Thus securing the connection and eliminating loosening by over the road operation of a vehicle to which the device is attached. A second embodiment replaces the compression nut with a pair of flanges (68) held together by nuts and bolts. A third embodiment adds a radial compression gasket (76) to the basic configuration for use with liquids at higher pressures than exhaust systems of the preferred embodiment.

5 Claims, 5 Drawing Sheets

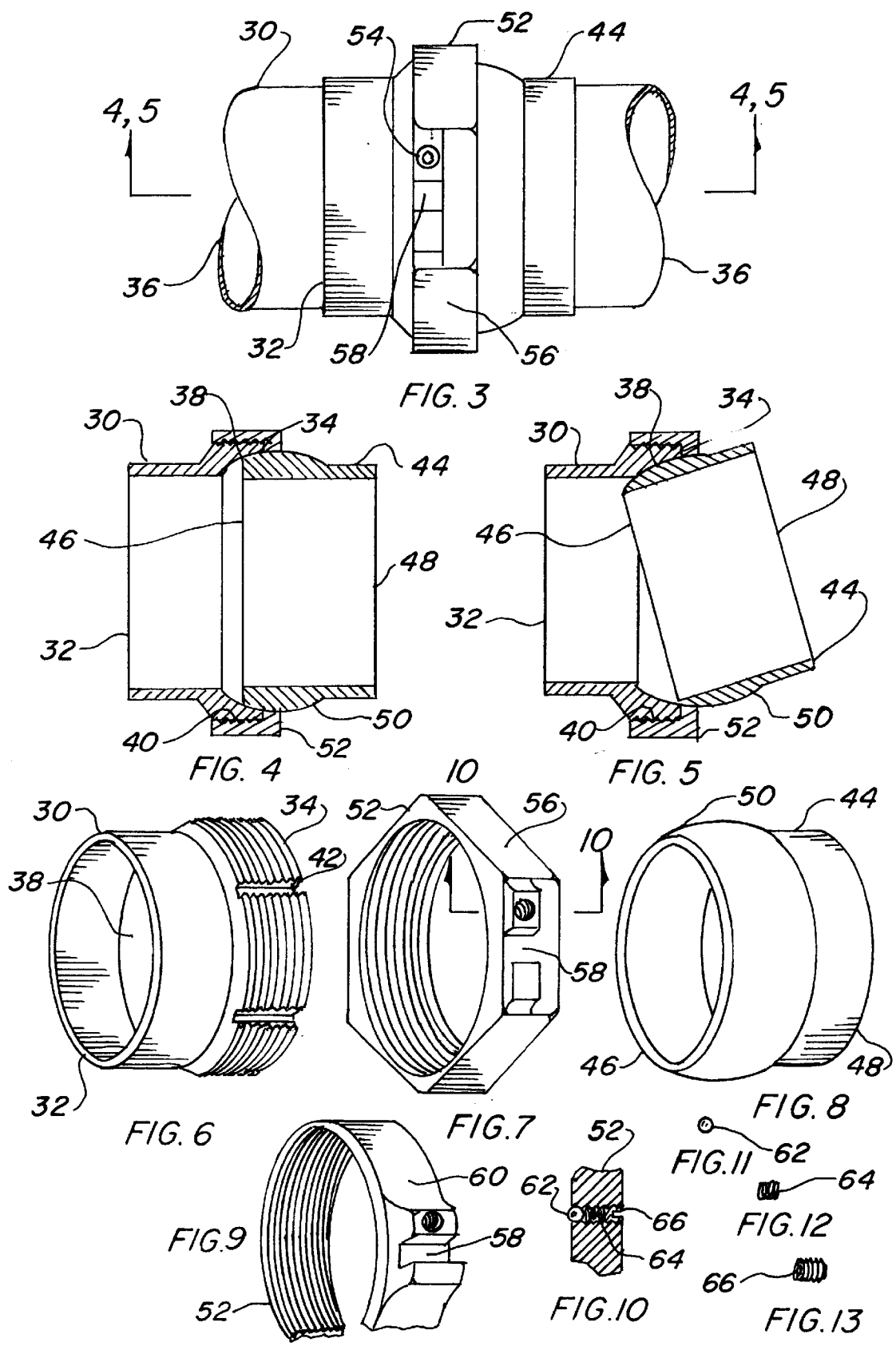

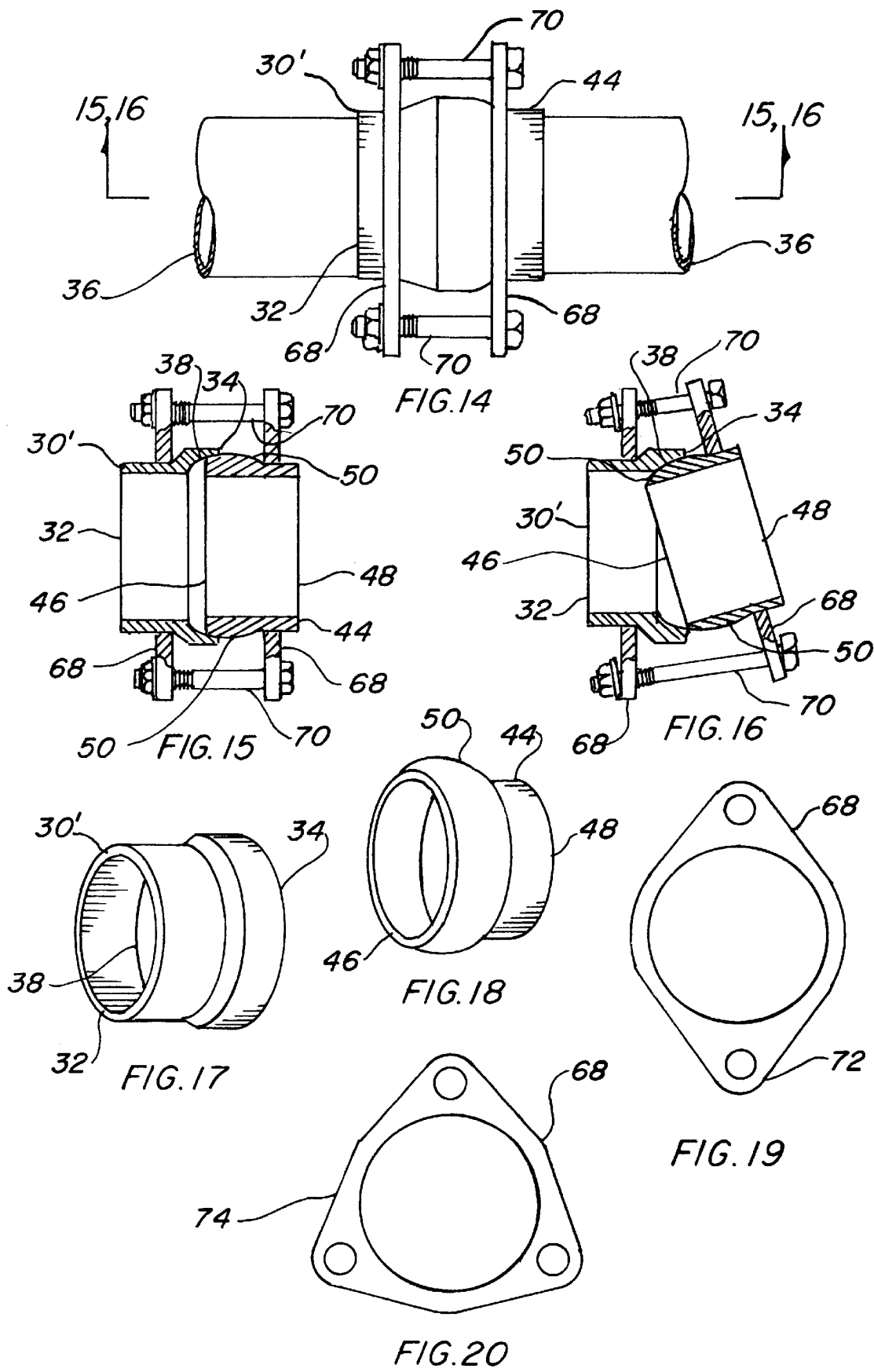

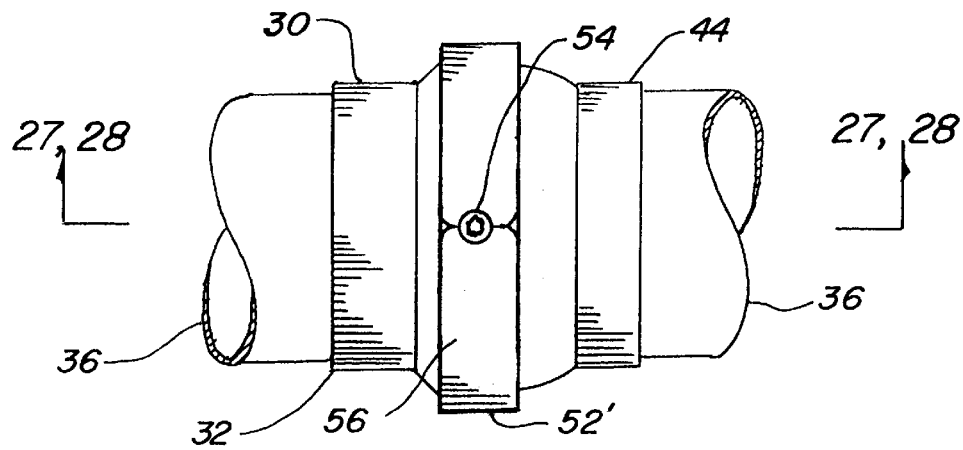
FIG. 26
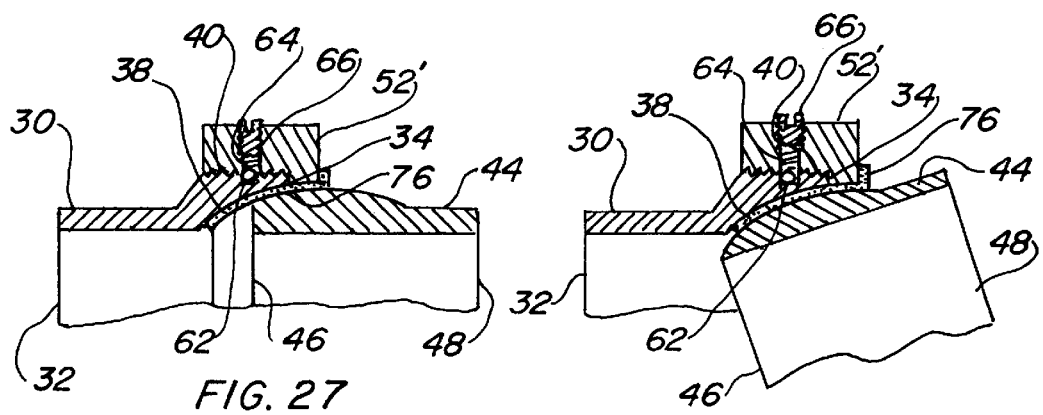
FIG. 27
FIG. 28
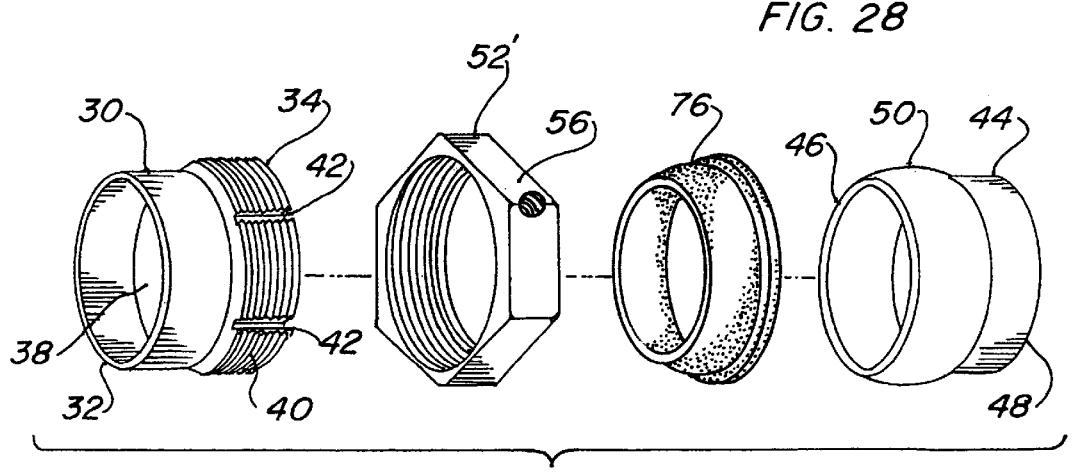
FIG. 29

UNIVERSAL PIPE JOINT

TECHNICAL FIELD

The invention pertains to the general field of motor vehicle exhaust piping and more particularly to a universal pipe joint that permits connection with angular alignment of two mating pipes and that may be secured in place with a set screw.

BACKGROUND ART

Previously, many types of universal joints have been used to provide an effective means to align two pipe ends when they are not exactly in a linear geometry. In the field of motor vehicle exhaust piping, connections are usually made by expanding one pipe end, and slipping the other end inside and then connecting by clamps or welding the joint together. Prior art has not fully satisfied this need by providing a universal joint that is reasonably inexpensive and simple in construction, as most presently available prior inventions use rather complicated rings, threads and radial surfaces to correct pipe misalignments.

A search of the prior art did not disclose any patents that read directly on the claims of the instant invention, however the following U.S. patents are considered related:

| Pat. No. | Inventor | Issue Date |
| --- | --- | --- |
| 5,101,915 | Witte | Apr. 7, 1992 |
| 4,556,227 | Sato et al. | Dec. 2, 1985 |
| 3,938,833 | Miyaoka | Feb. 17, 1976 |
| 3,931,992 | Coel | Jan. 13, 1976 |

Witte in U.S. Pat. No. 5,101,915 teaches a pipe joint that can be used for joining pipes or tubing of all types by using an adjustable angle joint with a double set of threads on each end and a seal inbetween.

U.S. Pat. No. 4,556,227 issued to Sato, et al. discloses a universal pipe joint which uses a connector housing with a main cavity defined by an internal spherical concave wall, thus forming a connector housing body. A pair of axially spaced spilt rings, with inclined external walls, are in contact with the concave walls. Each of the split rings are deformable so as to be inserted into a main cavity and expand to an operating position with a spacer seal ring sandwiched between the rings.

Miyaoka in U.S. Pat. No. 3,938,833 discloses a pair of articulating rings fitted over the open ends of pipes. A spherical convex outer surface on each ring engages a pair of concave inner surfaces on the coupling. A sealing member is provided between each pipe and articulation ring. For attachment, each ring is provided with an internal annular groove receiving split lock ring, which engages external screws in the pipe using the internal annular groove in the pipe to receive the screws. A recess engaged by the lock ring attaching an articulation ring to one of the pipes, is made axially wider than the lock ring to permit relative axial movement at the joint.

U.S. Pat. No. 3,931,992 issued to Coel discloses a connector having a tail piece with a ball end and a socket adapted to be snapped over the ball end with a coupling nut threadably engaging a pipe that is connected thereupon. The nut is threaded into engagement, thus urging the socket into a fluid seal, regardless of the angular disposition of the tail piece relative to the pipe element.

DISCLOSURE OF THE INVENTION

Misaligned exhaust piping has been a problem in the automotive industry since the inception of engine driven motor vehicles. In the past exhaust systems were relatively simple, with exhaust tubing leaving the engine manifold and passing under the vehicle to a muffler and then on through a simple tail pipe. With any, internal combustion engine the exhaust expelled contains noxious emissions which create health hazards. In order to combat this problem, environmental controls were introduced that required the use of a catalytic converter in the exhaust line upstream of the muffler. Making matters worse automobiles were basically smaller and dual exhaust systems became more popular. This created alignment problems in the aftermarket replacement field as exhaust lines were shorter, components larger, and often replacement parts are generic and not exactly the same configuration as the original parts. Further, the use of flexible exhaust tubing, which was previously popular, has diminished due to corrosion problems and in some cases government regulations.

In view of the above disclosure, it is the primary object of the invention to provide a universal joint that requires very little length in the exhaust line and is easy to install in a conventional manner using an internal slip fit of the pipe which permits the joint to be connected normally and allows misalignment up to 15 degrees.

Another object of the invention is that when the pipe joint is installed it may be locked in place with a simple hex key, thus precluding loosening of the threaded portion of the compression nut by vibration of the vehicle during use.

An important object of the invention is that conventional tools may be used for installation. Wrenches used for flat surfaces such as hexagonal nuts and the like and hook like spanners used in the exhaust system industry are utilized along with hex keys which are abundantly available.

Still another object of the invention is that the joint is formed of only three basic elements, all of which are uncomplicated and economically manufactured. An inexpensive ball, spring and lock screw are required to complete the device, thus allowing the invention to be within the economic reach of all.

Yet another object of the invention is its adaptability. By the addition of a resilient radial compression gasket the universal joint may be used with pressurized fluid such as a liquid, thereby expanding its utility to other fields such as plumbing and gas piping.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a side elevation view of the preferred embodiment with exhaust pipes attached on each end.

FIG. 4 is a cross-sectional view taken along lines 4—4 of FIG. 3 with the universal pipe joint in a straight in-line position.

FIG. 5 is a cross-sectional view taken along lines 5—5 of FIG. 3 illustrating a universal pipe joint in an extreme angular position.

FIG. 6 is a partial isometric view of a female adapter fitting in the preferred embodiment removed from the invention for clarity.

FIG. 7 is a partial isometric view of a compression nut in the preferred hex nut configuration completely removed from the invention for clarity.

FIG. 8 is a partial isometric view of a male adapter fitting in the preferred embodiment removed from the invention for clarity.

FIG. 9 is a fragmentary isometric view of a compression nut in the round body configuration completely removed from the invention for clarity.

FIG. 10 is a partial cross-sectional view taken along lines 10—10 of FIG. 7 illustrating a spring-loaded ball.

FIG. 11 is a isometric view of the ball shown by itself.

FIG. 12 is a partial isometric view of the spring removed from the invention for clarity.

FIG. 13 is a partial isometric view of a socket set screw completely removed from the invention for clarity.

FIG. 14 is a side elevation view of the second embodiment using flanges to attach the fittings together and exhaust pipes attached on each end.

FIG. 15 is a cross-sectional view taken along lines 15—15 of FIG. 14 illustrating a universal pipe joint in a straight in-line position.

FIG. 16 is a cross-sectional view taken along lines 16—16 of FIG. 14 illustrating a universal pipe joint in an angular position.

FIG. 17 is a partial isometric view of a female adapter fitting in the second embodiment removed from the invention for clarity.

FIG. 18 is a partial isometric view of a male adapter fitting in the second embodiment removed from the invention for clarity.

FIG. 19 is a front view of a two bolt flange in the second embodiment completely removed from the invention for clarity.

FIG. 20 is a front view of a three bolt flange in the preferred embodiment entirely removed from the invention for clarity.

FIG. 26 is a side elevation view of the third embodiment with exhaust pipes attached on each end.

FIG. 27 is a cross-sectional view taken along lines 22—22 of FIG. 21 illustrating the universal pipe joint in a straight in-line position.

FIG. 28 is a cross-sectional view taken along lines 23—23 of FIG. 21 illustrating a universal pipe joint in an angular position.

FIG. 29 is an exploded view of the third embodiment.

BEST MODE FOR CARRYING OUT THE INVENTION

Figure 1:
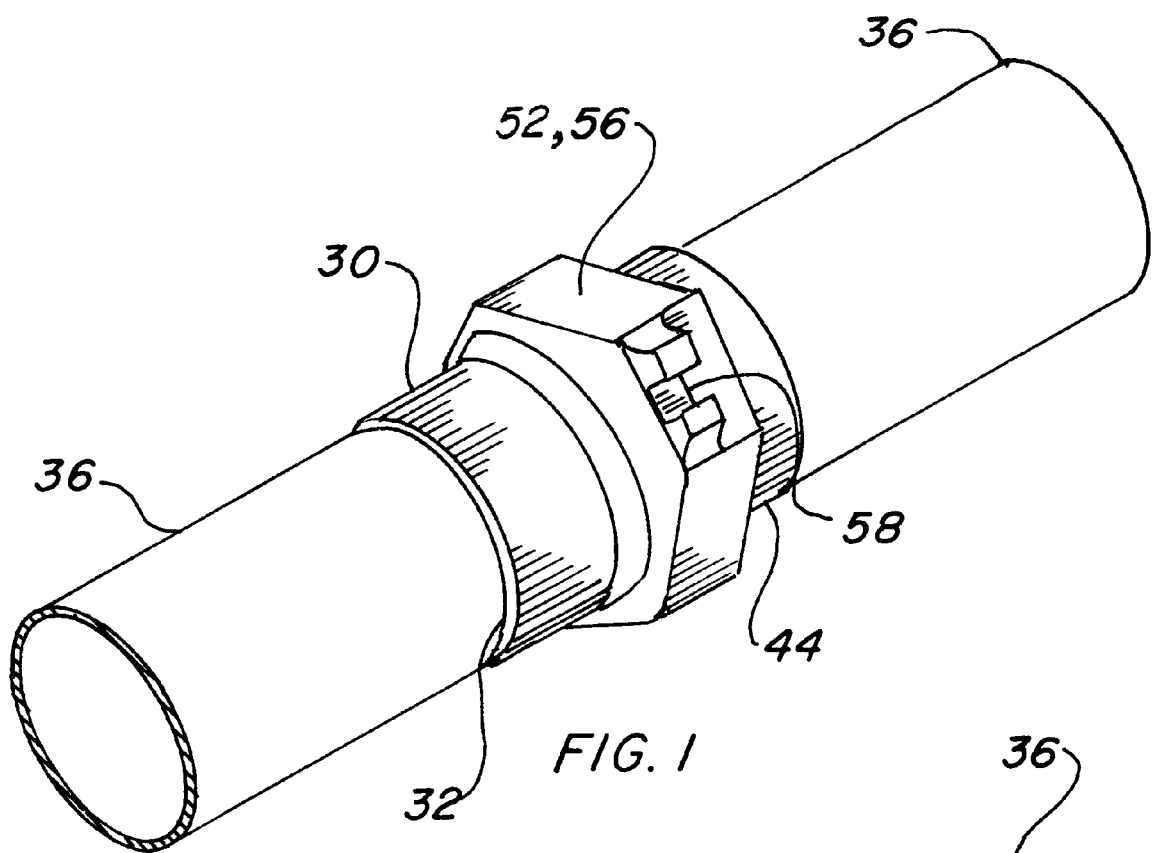
FIG. 1 is a partial isometric view of the preferred embodiment.
Figure 2:
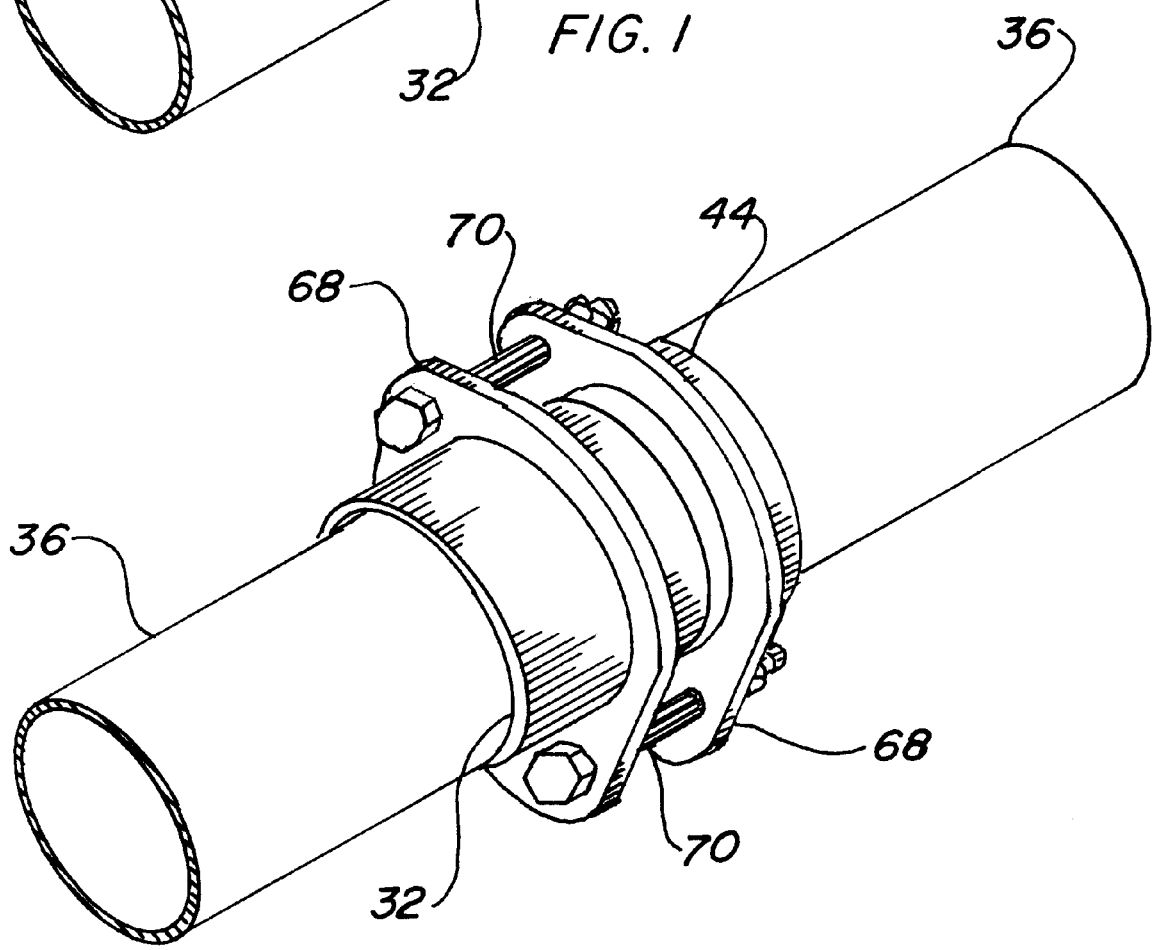
FIG. 2 is a partial isometric view of the second embodiment.
Figure 21:
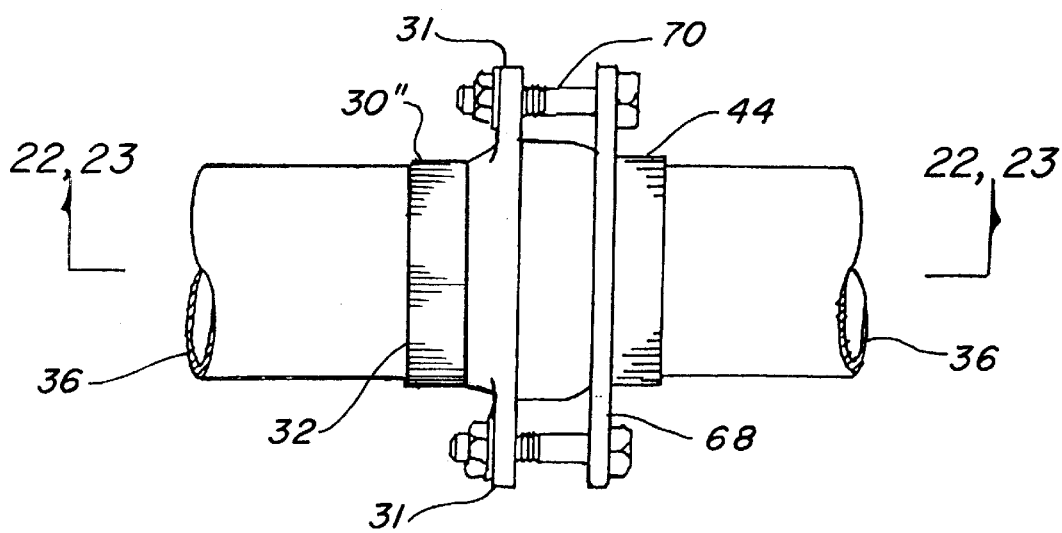
FIG. 21 is a side elevation view of a variation of the second embodiment using one integral and one separate flange to attach the fittings together with exhaust pipes attached on each end.
Figure 22:
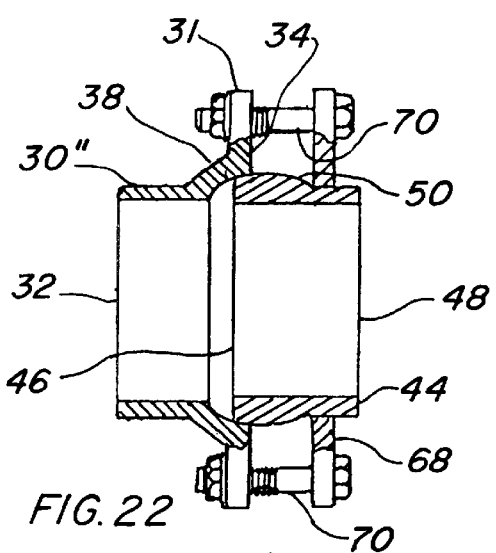
FIG. 22 is a cross-sectional view taken along lines 22—22 of FIG. 21 illustrating the second embodiment of the universal pipe joint in a straight in-line position.
Figure 23:
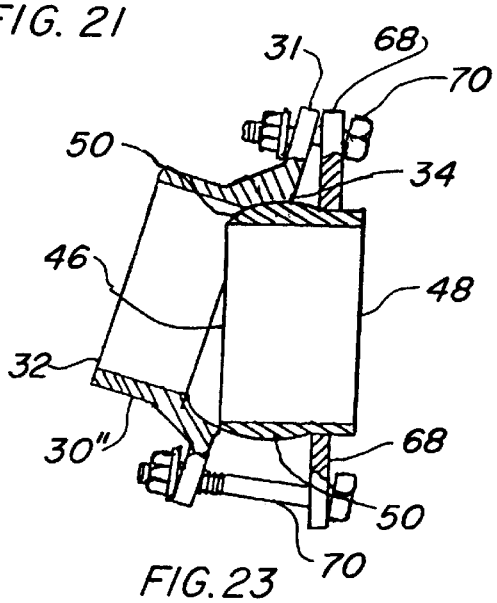
FIG. 23 is a cross-sectional view taken along lines 23—23 of FIG. 21 illustrating the second embodiment of the universal pipe joint in an angular position.
Figure 24:
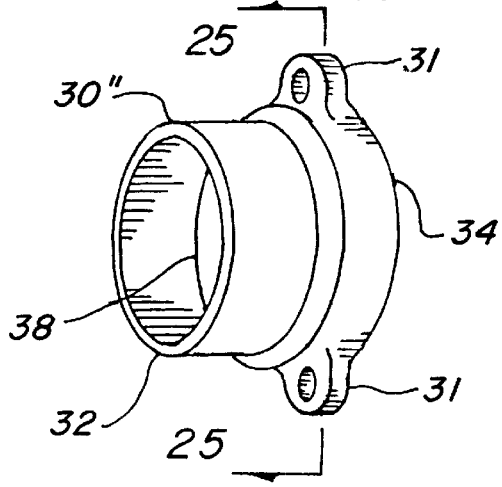
FIG. 24 is a partial isometric view of the female adapter fitting in the variation of the second embodiment removed from the invention for clarity.
Figure 25:
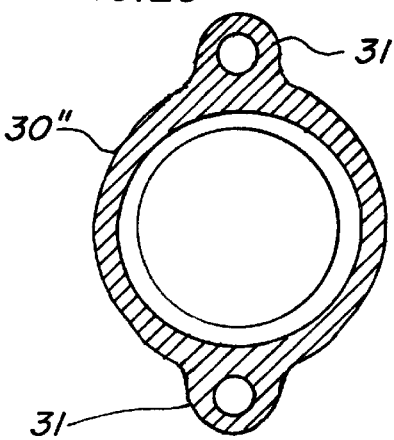
FIG. 25 is a cross-sectional view taken along lines 25—25 of FIG. 24 showing the female adapter fitting.

The best mode for carrying out the invention is presented in terms of a preferred, second, and third embodiment. All three of the embodiments are primarily designed alike with only the method of applying compression and locking the device in place changing slightly. The preferred embodiment is shown in FIGS. 1 and 3–13, and is comprised of a female adapter fitting 30 that includes a first end 32 and a second end 34. The first end 32 is suitable for attachment to a round pipe by having the inside diameter sized to mate with the outside diameter of an exhaust pipe 36. The female adapter fitting 30 has a radial interior diameter 38, which is contiguous with the inside diameter of the first end 32, and forms the second end 34 of the adapter, as shown in FIGS. 4 and 5. The female adapter fitting 30 further includes external threads 40 on an outside surface directly opposite the radial interior diameter 38, with a plurality of locking grooves 42 disposed completely through the external threads 40 at right angles thereunto, as shown in FIG. 6.

A male adapter fitting 44 also has a first end 46 and a second end 48. The first end includes a radial exterior diameter 50 which interfaces with the female adapter radial interior diameter 38 such that the angular displacement of the male adapter 44 may misalign with the female adapter 30, as depicted in FIG. 5. The second end 48 of the male adapter fitting 44 is also suitable for attachment to a round pipe by having the inside diameter sized to mate with the outside diameter of an exhaust pipe.

Compression means for tightening the female adapter fitting 30 onto the male adapter fitting 44 are employed, such that their respective radial diameters 38 and 50 interface with each other to create a fluid tight bond. The compression means consist of a threaded compression nut 52 complete with a spring-loaded ball 54. The spring-loaded ball 54 interfaces into one of the female adapter's locking grooves 42, for securing the compression nut into position after it is tightened. The spring-loaded ball 54 consists of a ball 62, a spring 64, and a socket set screw 66, each depicted by themselves in FIGS. 11–13.

There are two configurations of the compression nut 52. The first is illustrated in FIGS. 1, 3, and 7, and is defined by a plurality of flats 56 on the outside surface of the nut 52, which is preferably in a hexagonal shape, and at least one raised tightening tool groove 58 on a portion of one of the flats 56. The preferred hexagonal flats 56 permit a standard wrench to be used which is well known to any mechanic and the raised tightening tool groove 58 is also well known in the art of exhaust systems, thereby providing a choice of tools to be used for tightening the nut on the fitting. The second configuration of the compression nut 52 is shown in FIG. 9 and has the same threads as above but eliminates the flats completely and has a round outside surface 60 and at least one tightening tool groove 58 extending the entire width of the nut 52. While one groove 58 is shown, any number of grooves 58 may be used when tightening the nut with a common hook-like spanner.

The universal pipe joint when used in vehicle exhaust systems, is preferably fabricated entirely of metal, which may be carbon steel, plated with chrome, cadmium, zinc or aluminized. Stainless steel may also be employed such as the type T 320 formulation, which is used frequently in the aftermarket exhaust industry for its resistance to corrosion and its anti-magnetic characteristics.

The second embodiment is illustrated in FIGS. 14–25 and utilizes the same basic female and male adapter 30 and 44, except that the female adapter fitting 30' does not require the external threads 40 with their locking grooves 42. The compression means for tightening the female adapter fitting 30' onto the male adapter fitting 44 does change in its structure. Instead of using a compression nut, a pair of exhaust pipe flanges 68 with threaded fasteners 70 engage both the male fitting 44 and female adapter fitting 30' for drawing them together using compression supplied by the threaded fasteners. FIGS. 14–16 illustrate this function as the flanges 68 slip over the fittings 30' and 44 abut into a tapered portion of the female fitting 30' and the radial exterior diameter 50 of the male fitting 44 as shown. Threaded fasteners 70 are in the form of conventional nuts and bolts of a length as required according to the angular displacement of the pipe joint. The exhaust pipe flanges 68 utilized in the compression means may be the two bolt type 72 as shown in FIG. 19, or the three bolt type 74, as shown in FIG. 20. Both types are in common usage and well know in the art. A variation of the second embodiment is illustrated in FIGS. 21–25 and differs only in that the female fitting 30" includes a plurality of integral flanges 31 that have the same bolt circle and mating holes therethrough as the exhaust pipe flange 68, depicted in FIGS. 21–25. This permits the female fitting 30" to mate with either configuration of exhaust pipe flange, the two bolt type 72 or the three bolt type 74, as discussed above. In any event the threaded fasteners 70 are use in the same manner and accomplish the same purpose. As previously described, the fabricating material for this second embodiment in both variations may be same as that of the preferred embodiment.

The third embodiment of the invention is illustrated in FIGS. 26–29, and again functions in an identical manner except a radial compression gasket 76 is disposed between the radial diameters 38 and 50 of the male and female adapter fittings 30 and 44, for assuring a liquid seal integrity. The fittings 30 and 44 are identical however, the threaded compression nut 52' differs slightly by having hex flats 56 on all outside surfaces with the spring-loaded ball 54 disposed at an apex of one pair of hex flats 56. The spring loaded ball functions in the same manner by interfacing into the female adapter fitting locking grooves 42 for fastening the universal joint into position. The basic difference is that the third embodiment seals the joint sufficiently for liquid pressures such as found in city water, thus expanding its use to the plumbing field. It is also possible to employ the same compression nut 52' with the preferred embodiment, as they function in the same manner and are embodiment may be the same metal construction as previously described or may be thermoplastic for the plumbing or piping industry using such formulations as polyvinylchloride (PVC), polypropylene, Teflon (PTFE), Nylon or the like.

The installation of the universal joint in the preferred and third embodiment is simple and straight forward with the male and female fittings 30 and 44 attached to the corresponding tubing in a conventional manner such as welding or clamping, in the exhaust history and by soldering or cementing in the plumbing or piping industry. The compression nut 52 is positioned loosely on the male adapter fitting 44 prior to connection of the fitting and when the two are contiguously engaged the nut 52 is tightened onto the external threads 40 of the female adapter fitting 30. As the nut is rotated either by a wrench or spanner the spring-loaded ball 54 progressively snaps into the locking groove 42 of the threads 40, creating a clicking sound as it passes through each groove. When the nut 52 is sufficiently tightened and the last click has been reached, as determined by the sound of the ball hitting the groove 42, the ball 62 is locked in place compressing the spring 64 by rotating the socket set screw 66 manually using a hex key tool. It should be noted that the fit of the compression nut 52 adjoining the radial diameters 38 and 50 of the fittings 30 and 44, when tightened by the nut, urges the parts together thereby creating a crush fit sufficient to seal the union therebetween. In the second embodiment the threaded fasteners 70 provide the same function but no sound is made.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A universal pipe joint for attaching two round pipes together while permitting angular misalignment therebetween, said universal pipe joint comprising:
   a) a female adapter fitting having a first end and a second end with the first end suitable for attachment to a round pipe and the second end having a radial interior diameter,
   b) a male adapter fitting having a first end and a second end with the first end having a radial exterior interfaces with the female adapter radial interior diameter of said female adapter fitting such that the displacement of the male adapter may angularly misalign with the female adapter also the second end is suitable for attachment to a round pipe, and
   c) a threaded compression nut for tightening the female adapter fitting onto the male adapter fitting such that the radial diameters engage each other, thus creating a fluid tight bond, wherein said threaded compression nut having a spring-loaded ball for interfacing into the female adapter fitting locking grooves for securing the compression nut into position.

2. The universal pipe joint as recited in claim 1 wherein said compression nut further comprising a plurality of flats on an outside surface having at least one raised tightening tool groove thereupon.

3. The universal pipe joint as recited in claim 1 wherein said compression nut further comprises a round outside surface having at least one tightening tool groove thereupon.

4. The universal pipe joint as recited in claim 1 wherein said spring-loaded ball further comprises a ball, a spring and a socket set screw contiguously engaging each other.

5. A universal pipe joint for attaching two round pipes together while permitting angular misalignment therebetween, said universal pipe joint comprising:

a) a female adapter fitting having a first end and a second end with the first end suitable for attachment to a round pipe and the second end having a radial interior diameter, b) a male adapter fitting having a first end and a second end with the first end having a radial exterior interfaces with the female adapter radial interior diameter of said female adapter fitting such that the displacement of the male adapter may angularly misalign with the female adapter also the second end is suitable for attachment to a round pipe, c) compression means for tightening the female adapter fitting onto the male adapter fitting such that the radial diameters intimately engage each other, thus creating a fluid tight bond, d) a resilient radial compression gasket disposed between the radial diameters of the male and female adapter fittings for assuring a liquid seal integrity and e) wherein the entire joint is constructed of metal.

\* \* \* \* \*